United States Patent [19]
Ratte, Jr.

[11] 3,778,871
[45] Dec. 18, 1973

[54] CONNECTORS

[75] Inventor: Wilfred L. Ratte, Jr., White Bear Lake, Minn.

[73] Assignee: Water Gremlin Company, White Bear Lake, Minn.

[22] Filed: July 15, 1971

[21] Appl. No.: 163,033

Related U.S. Application Data

[63] Continuation of Ser. No. 830,447, June 4, 1973, abandoned.

[52] U.S. Cl............... 24/236, 24/90 HA, 43/44.53, 43/44.87
[51] Int. Cl...................... A44b 13/02, A01k 95/00
[58] Field of Search............. 24/231, 335, 236–237, 24/230, 193; 43/42.49, 44.9, 44.1, 44.97

[56] References Cited
UNITED STATES PATENTS

| | | | |
|---|---|---|---|
| 883,048 | 3/1908 | Pflueger | 43/43.1 |
| 2,804,715 | 3/1957 | Kimbrough | 43/44.87 |
| 3,323,248 | 6/1967 | Sutryn | 43/42.53 X |
| 399,831 | 3/1889 | Beirson | 24/230.5 TP |
| 2,539,825 | 1/1961 | Genua | 24/237 UX |
| 3,200,459 | 8/1965 | Hartman | 24/236 X |
| 3,444,599 | 5/1969 | Amon | 24/236 |

FOREIGN PATENTS OR APPLICATIONS

| | | | |
|---|---|---|---|
| 970,709 | 1/1951 | France | 43/43.1 |
| 19,324 | 5/1890 | Great Britain | 43/44.92 |
| 869,915 | 6/1961 | Great Britain | 24/90 |

*Primary Examiner*—Paul R. Gilliam
*Attorney*—Stryker and Jacobson

[57] ABSTRACT

A connecting element molded from a plastic such as nylon with a straight portion at one end and a looped portion at the other end for attachment to fishing lines and the like. The straight portion is inserted through a hole in the object being connected and melted so as to enlarge it and prevent its withdrawal from the hole.

2 Claims, 5 Drawing Figures

PATENTED DEC 18 1973 3,778,871

INVENTOR
WILFRED L. RATTE, JR.

BY *Stryker & Jacobson*

ATTORNEYS

CONNECTORS

This is a continuation of application Ser. No. 830,447, filed June 4, 1973, now abandoned.

BACKGROUND OF THE INVENTION

In the prior art, objects such as sinkers, hooks, and the like have been fastened to fishing lines by means of wire loops. The wire is inserted through the object to be fastened, looped to form a circle, and twisted several times to secure it in place. This operation must be repeated for each loop and requires a complicated machine. Furthermore, besides being costly to produce, the finished product has several disadvantages. Sharp edges remain on such wire loop devices which tend to snag objects in the water and, also, to cause damage to the fishing line. In addition, some of the metal used tends to corrode in water and is readily visible. The present invention avoids these disadvantages and provides numerous other advantages.

SUMMARY OF THE INVENTION

Briefly, my invention involves the use of plastic to form the connector instead of metal wire. Several types of plastic may be used, including nylon, glass reinforced nylon, and Dalryn. The preferred embodiment utilizes nylon molded into a relatively straight pin arrangement with a looped portion on one end. The loop may be closed or it may be formed into a flexible, nearly closed loop which permits a snapping engagement with another connecting device. The straight portion of the connector is inserted through a hole in the object being attached. The protruding end of the nylon shank is heated by any suitable method, including chemical or ultrasonic means. When a plastic such as nylon is heated, it melts and forms a ball larger than the diameter of the pin, thus preventing withdrawal of the pin from the hole. In addition, the melted ball takes the shape of a symetric bearing surface so that the sinker or connected object may readily swivel about the pin or shank portion of the connector. This symetrical nylon bearing does not clog or jam up with sand and silt normally encountered under water. Since a plastic such as nylon is relatively soft and pliable, the present invention is less likely to cause damage to connecting lines than previous wire-type connectors. Since my connector is molded, it has no sharp edges and, thus, is much less likely to accidentally snag obstructions in the water. The use of nylon for the looped portion is advantageous as it is not abrasive to the nylon fish lines as some metal loops are. Obviously, if the loop is abrasive, it wears through the fish line quite readily, thus causing the line to break when a force is exerted on the line. Also, nylon tends to be relatively transparent and, therefore, less visible in water than prior art metal connectors. Consequently, it is an object of the present invention to provide an improved connector. A further object of my invention is to provide fishing tackle which is lighter, less costly, and easier to produce.

Other objects and advantages will become apparent to those skilled in the art upon consideration of the following discussion and drawings.

DESCRIPTION OF THE PREFERRED EMBODIMENT

Figure 1:
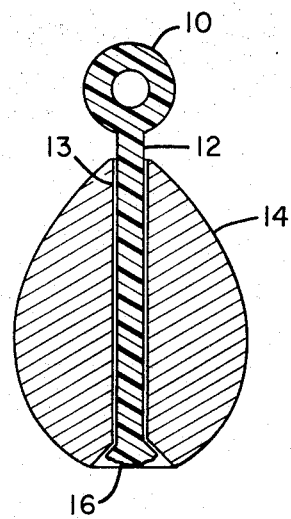
FIG. 1 shows sectionally a typical embodiment on my invention in which a sinker is mounted by means of a nylon connector.

In FIG. 1, a connector is shown having a looped portion 10 and a shank portion 12. As already mentioned, this connector may be formed from nylon, or glass reinforced nylon or a suitable moldable plastic material having good strength characteristics and relatively good pliability. The shank portion 12 of the connector is inserted through a hole 13 in a lead sinker 14 shown in section in FIG. 1. After insertion, the shank portion 12, which is normally much longer than shown in the drawing, extends beyond sinker 14 by a substantial amount. Heat is applied to this extended end either by chemical action, ultrasonic action, or direct contact. The heat melts the plastic, which forms into a ball 16 as shown in FIG. 1. Ball 16 is relatively symmetric and spherical and, therefore, prevents shank 12 from withdrawing from hole 13 while providing a bearing surface upon which sinker 14 may readily swivel. In the preferred embodiment, the connector is formed of nylon which provides a tough but smooth bearing surface. Of course, this type of connector may be used to mount any object to any other object simply by inserting the shank portion 12 through a hole in the object to be fastened, melting the excess portion of shank 12 into a retaining ball, and tying the other object to loop 10. In FIG. 1, looped portion 10 is a closed circle with a hole of diameter sufficient to receive fishing line, wire, or other types of connecting apparatus. Numerous other types of molded connectors may be formed as shown by the other figures.

Figure 2:
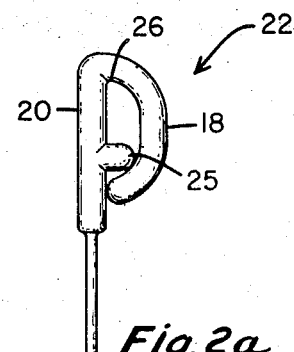
FIG. 2 and FIG. 2a shows two additional embodiments with variations on the design of the connector.
Figure 2A:
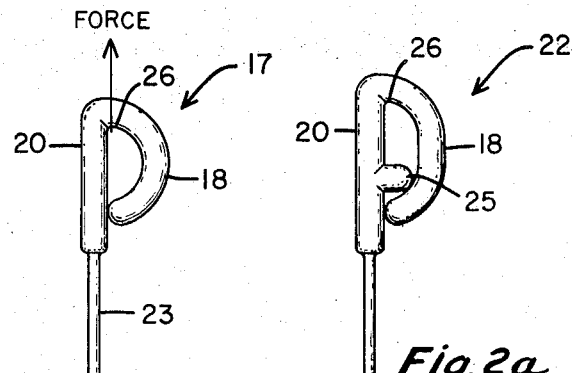

In FIG. 2 and 2a, two other possible configurations 17 and 22 are shown for my connector. Both embodiments in FIG. 2 are formed with a straight side 20 and a substantially semicircular side 18. The semicircular side 18 is joined to side 20 at one end but not at the other so that a fishing line, hook or other connector may simply be snapped into place by flexing side 18 away from side 20 to open the loop. For example, it might be desirable to connect a nylon connector such as shown in FIG. 1 to the embodiment shown in FIG. 2 and 2a, in which case the semicircular portion 18 would simply flex away from the straight portion 20 so as to permit easy entry of connector 10. Semicircular portion 18 then returns into place contiguous to side 20.

Connector 17 is shown with a narrow portion shank 23 so as to demonstrate the various possibilities of molding such a connector. Connector 22 is shown with an additional locking finger 25 which serves to further reduce the possibility of disengagement once some connecting object is snapped into place on connector 22. One of the advantages that should be noted relative to the embodiments of FIG. 2 is that any connecting device passing through the looped portion of connectors 17 and 22, under strain, pulls up into the uppermost corner of the looped portion relatively close to shank portion 20. Thus, any force is applied in a relatively straight line with the shank portion 20. This minimizes the tendency to pull semicircular portions 18 open. In addition, the connectors have a radiused corner 26 which has an excess of material to give the loop strength. This insures that portion 18 will not be easily pulled open so as to allow the line to slip out. The radius also helps force portion 18 up tight against shaft 20. This design feature is advantageously utilized with respect to the embodiment of FIG. 3.

Figure 3:
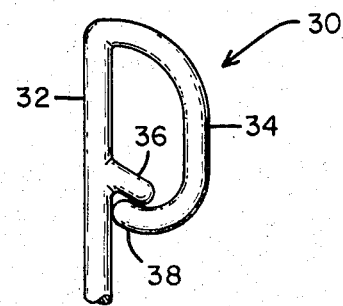
FIG. 3 shows still another variation in design of the connector.

In FIG. 3, a connector generally indicated by the number 30 is shown. Connector 30 has a shank portion 32, a thinner semicircular portion 34, and an inclined finger portion 36. Shank portion 32 is purposely molded to be much thicker than curved portion 34. When an object is connected to connector 30, and a strain is applied between the two, semicircular portion 34 yields slightly, causing hook portion 38 to close into the acute angle formed by finger 36 and shank 32. This action closes the looped portion of connector 30, causing it to lock and preventing any escaope of the connected apparatus. It is, of course, obvious that many variations may be made to the embodiment shown, including a connector having a looped portion at each end connected by the same shank portion. Any type of looped portion could be used with any other type of looped portion. A typical example of a variety useful in fishing tackle is the embodiment shown in FIG. 4.

Figure 4:
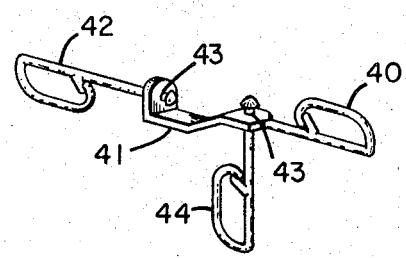
FIG. 4 shows how the connectors may be combined to form a swivel connection for use in fishing tackle.

In FIG. 4, three looped portions, such as shown in FIG. 3, are connected together to provide a swivel connector for fishing tackle. A loop 40 has a shank portion 41 with two holes 43 in it positioned substantially perpendicular to each other. Two additional connectors 42 and 44 are mounted to connector 40 by insertion into holes 43 and having the ends of their shanks melted as described with respect to FIG. 1. In this manner, a three-way connector is provided having complete freedom to swivel in all directions, thus preventing entanglement of the fishing line. Such a three-way swivel is typically used to connect a sinker and a separate hook and bait line to the fishing line. The dimensions of the objects in FIG. 4 are emphasized for clarity. In reality, the hole for connector 42 is positioned as close as possible to the horizontal portion of shank 41 so as to provide, as nearly as possible, a straight pull action between connectors 40 and 42. Because of the many variations afforded by different molding process, I do not intend to be bound to the specific embodiments shown in the drawings except as defined by the appended claims.

I claim:

1. A two-piece swiveling sinker for fishing tackle comprising a lead weight and a line attachment member, said lead weight having sufficient weight to sink a fishing line and hook and said line attachment member having a surface to allow said lead weight to rotate thereon, said lead weight consisting of a single member, said lead weight having a hole therein of a first diameter for receiving a line attachment member, said lead weight further having a surface for rotatably engaging a line attachment member, said lead weight and said line attachment member coacting so that when a fishing line and hook are attached to said line attachment member, the fishing line and hook will sink when placed in water, said line attachment member consisting of a single piece pliable member formed from a polymer plastic material, said pliable member having a looped portion at one end having at least a portion of the loop dimension larger than the hole in said lead weight to thereby prevent said line attachment member from passing completely through the hole in said lead weight, a shank portion in the middle of a diameter less than the diameter of the hole in the lead weight so as to be suitable to pass through the hole in said lead weight and permit said lead weight to rotate about said entire line attachment member, said pliable member having an enlarged portion at the other end, said enlarged portion having a diameter greater than the diameter of the hole in said weight so as to be operable to prevent withdrawal of said shank portion from said hole, said enlarged portion comprising a heat formed section of said shank portion, said enlarged portion further having a surface for forming rotatable engagement with said surface on said lead weight so that said lead weight can rotate freely on said surface on said enlarged portion; said looped portion formed of a relatively rigid straight section on one side and a substantially semicircular section on the other side, said two sections being joined at one end and open and contiguous at the other end so as to allow sufficient relative flexing of said two sections to permit the entry of a connecting means therebetween into said looped portion; an additional finger portion extending at an acute angle from said straight section toward the inside of said substantially semicircular section portion to help keep said connecting means between said two sections; said contiguous end of said semicircular portion located on the outside of said finger portion; and said semicircular portion having a radiused corner with an excess of material at the junction of said semicircular portion to said straight sections to thereby provide additional strength to said semicircular portion.

2. The apparatus of claim 1 in which said polymeric plaster material comprises nylon.

* * * * *

UNITED STATES PATENT OFFICE
CERTIFICATE OF CORRECTION

Patent No. 3,778,871          Dated Dec. 18, 1973

Inventor(s)  Wilfred L. Ratte, Jr.

It is certified that error appears in the above-identified patent and that said Letters Patent are hereby corrected as shown below:

In the abstract page [63] and Column 1, line 3, the reference to related U. S. applications should read Continuation of Ser. No. 830,447, June 4, 1969, abandoned.

Signed and sealed this 30th day of April 1974.

(SEAL)
Attest:

EDWARD M. FLETCHER, JR.                C. MARSHALL DANN
Attesting Officer                      Commissioner of Patents